(12) United States Patent
Echigo et al.

(10) Patent No.: US 12,065,125 B2
(45) Date of Patent: Aug. 20, 2024

(54) VEHICLE CONTROL METHOD AND VEHICLE CONTROL DEVICE

(71) Applicant: NISSAN MOTOR CO., LTD., Yokohama (JP)

(72) Inventors: Ryo Echigo, Kanagawa (JP); Yoshiyasu Kimura, Kanagawa (JP)

(73) Assignee: NISSAN MOTOR CO., LTD., Yokohama (JP)

(*) Notice: Subject to any disclaimer, the term of this patent is extended or adjusted under 35 U.S.C. 154(b) by 866 days.

(21) Appl. No.: 17/265,892

(22) PCT Filed: Aug. 6, 2018

(86) PCT No.: PCT/IB2018/001015
§ 371 (c)(1),
(2) Date: Feb. 4, 2021

(87) PCT Pub. No.: WO2020/030938
PCT Pub. Date: Feb. 13, 2020

(65) Prior Publication Data
US 2021/0162980 A1    Jun. 3, 2021

(51) Int. Cl.
*B60W 20/13* (2016.01)
*B60K 6/46* (2007.10)
(Continued)

(52) U.S. Cl.
CPC ............... *B60W 20/13* (2016.01); *B60K 6/46* (2013.01); *B60W 10/06* (2013.01); *B60W 10/26* (2013.01);
(Continued)

(58) Field of Classification Search
CPC ...... B60W 20/13; B60W 20/16; B60W 10/06; B60W 10/26; B60W 2510/244; B60W 2540/10; B60W 2710/0644; B60K 6/46
See application file for complete search history.

(56) References Cited

U.S. PATENT DOCUMENTS 5,785,138 A *  7/1998  Yoshida ............... B60W 10/08
                                                180/65.245
10,001,074 B2 * 6/2018  Matsumoto ........... F02B 37/183
(Continued)

FOREIGN PATENT DOCUMENTS

DE   10 2012 109 731 A1   4/2013
EP        0 570 234 A1   11/1993
(Continued)

*Primary Examiner* — Bryan A Evans
(74) *Attorney, Agent, or Firm* — Foley & Lardner LLP (57) ABSTRACT

In the present invention, an internal combustion engine (7) drives a generator (6). The internal combustion engine (7) carries out a standby operation. The standby operation is an operation involving assisting power supply to a drive motor (2). During the standby operation of the internal combustion engine (7), the SoC of a battery (4) is equal to or higher than a predetermined SoC threshold. The operating point of the internal combustion engine (7) during the standby operation is further on a lower-output side than the operating point of the same during the charging of the battery (4). The operating point of the internal combustion engine (7) during the standby operation is an operating point in which the collector pressure of the internal combustion engine (7) is equal to or higher than a predetermined collector pressure threshold. The operating point of the internal combustion engine (7) during the standby operation is within a lean combustion region.

12 Claims, 4 Drawing Sheets

(51) Int. Cl.
 *B60W 10/06* (2006.01)
 *B60W 10/26* (2006.01)
 *B60W 20/16* (2016.01)
(52) U.S. Cl.
 CPC ....... *B60W 20/16* (2016.01); *B60W 2510/244* (2013.01); *B60W 2540/10* (2013.01); *B60W 2710/0644* (2013.01)

(56) References Cited

U.S. PATENT DOCUMENTS

2004/0043863 A1* 3/2004 Kondo .................. F16H 61/143
 477/38
2018/0135568 A1* 5/2018 Oshita .................... F02M 26/09

FOREIGN PATENT DOCUMENTS

| JP | 05-328526 | 12/1993 |
|----|-----------|---------|
| JP | 05-328526 A | 12/1993 |
| JP | 08-256403 A | 10/1996 |
| JP | 10-274069 A | 10/1998 |
| JP | 2002-89303 | 3/2002 |
| JP | 2004-023985 A | 1/2004 |
| JP | 2004-084830 A | 3/2004 |
| JP | 2004-304909 A | 10/2004 |
| JP | 2017-002789 A | 1/2017 |

* cited by examiner

VEHICLE CONTROL METHOD AND VEHICLE CONTROL DEVICE

TECHNICAL FIELD

The present invention relates to a vehicle control method and a vehicle control device.

BACKGROUND ART

A patent document 1 discloses a hybrid vehicle provided with an electric motor for driving the vehicle, and an internal combustion engine for generating electric power, wherein the internal combustion engine is operated in a predetermined standby mode when the internal combustion engine is not required to operate for electric power generation.

The standby operation of the internal combustion engine according to patent document 1 is performed in an operation region low in engine load and engine speed, or in an operation region where lean combustion is performed.

However, patent document 1 is silent about an operating point (engine load and engine speed) of the internal combustion engine when the standby operation employs the operation region where lean combustion is performed.

When an SOC of a battery is high, the standby operation is performed while preventing the battery from being overcharged, and a power output (engine load or engine speed) of the internal combustion engine is simply reduced as for stoichiometric combustion, in-cylinder gas flow motion may be adversely affected, thereby causing unstable combustion, and adversely affecting exhaust performance.

PRIOR ART DOCUMENT(S)

Patent Document(s)

Patent Document 1: Japanese Patent Application Publication No. H5-328526

SUMMARY OF INVENTION

According to the present invention, a vehicle includes: an electric power generator structured to generate electric power and supply the electric power to a battery; an electric motor structured to be driven by electric power from the battery or from the electric power generator, and drive the vehicle; and an internal combustion engine structured to drive the electric power generator, and vary an air fuel ratio. Under a condition that an SOC of the battery is greater than or equal to a predetermined SOC threshold value, a standby operation of the internal combustion engine is performed for standby to assist electric power supply to the electric motor, wherein the standby operation is implemented by performing a lean combustion operation at a first operating point that is lower in engine power output than a second operating point set for charging the battery in response to a condition that the SOC of the battery is less than the SOC threshold value, wherein intake pressure of the internal combustion engine at the first operating point is greater than or equal to a predetermined intake pressure threshold value.

Thereby, during the standby operation for enhancing acceleration responsiveness to acceleration requesting, it is possible to ensure combustion stability of the internal combustion engine, while suppressing overcharging.

MODE(S) FOR CARRYING OUT INVENTION

The following describes an embodiment of the present invention in detail with reference to the drawings.

Figure 1:
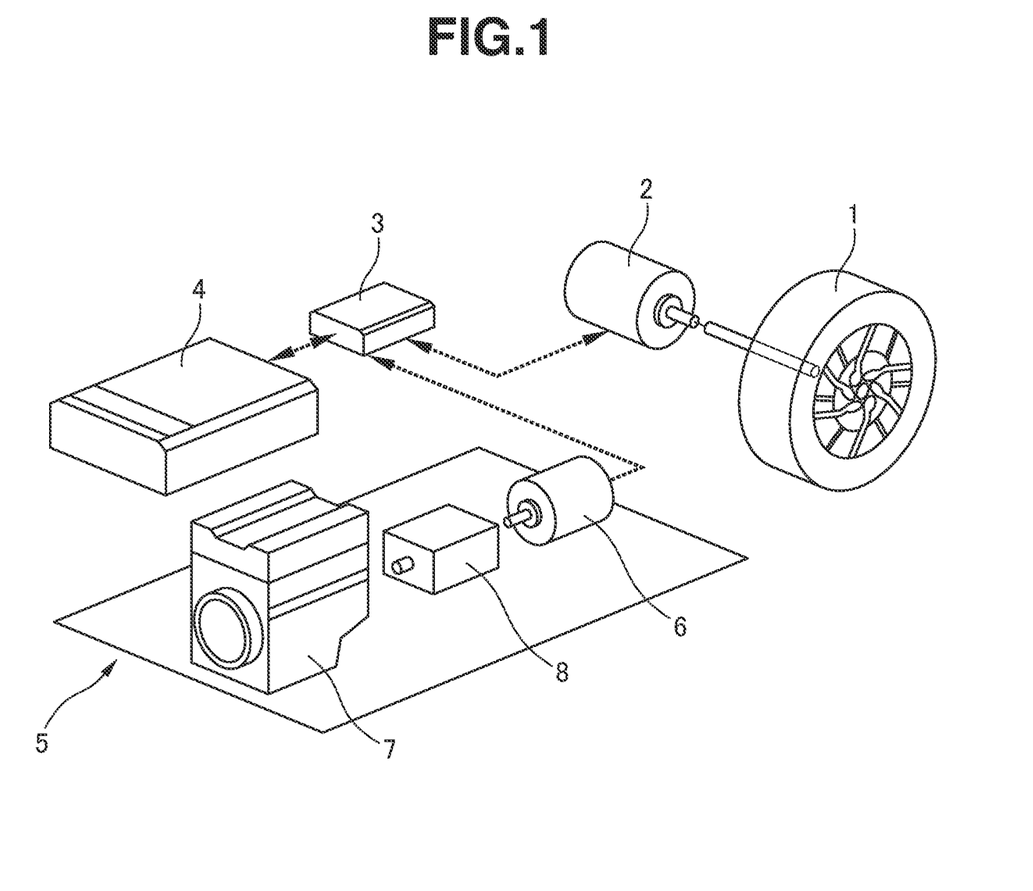
FIG. 1 is an explanatory view showing schematically system configuration of a hybrid vehicle to which the present invention is applied.

FIG. 1 is an explanatory view showing schematically system configuration of a hybrid vehicle to which the present invention is applied.

The hybrid vehicle includes: a driving wheel 1; a driving motor 2 structured to rotationally drive the driving wheel 1; an inverter 3 structured to supply AC power to driving motor 2; a battery 4 structured to supply electric power to inverter 3; and an electric power generation unit 5.

Vehicle driving wheel 1 is rotationally driven by driving motor 2 as a drive source.

Driving motor 2 is an electric motor such as a synchronous electric motor including a rotor implemented by a permanent magnet.

Driving motor 2 serves as a drive source of the vehicle and is driven by AC power from inverter 3. When the vehicle is decelerating, driving motor 2 functions also as an electric power generator, Specifically, driving motor 2 is capable of charging the battery 4 via inverter 3 with electric power resulting from regenerative energy during vehicle deceleration.

Inverter 3 is a power conversion circuit configured to convert electric power generated by electric power generation unit 5 and driving motor 2 into DC power, and supply the DC power to battery 4. Inverter 3 serves also as a power conversion circuit configured to convert the DC power outputted from battery 4 into AC power, and supply the AC power to driving motor 2.

Battery 4 is a secondary battery structured to be charged with the electric power generated by electric power generation unit 5 and driving motor 2, and store the electric power in DC power form. Battery 4 supplies the charged electric power to driving motor 2 via inverter 3.

Electric power generation unit 5 is generally composed of: an electric power generator 6; an internal combustion engine 7 structured to drive the electric power generator 6 for electric power generation; and a speed reducer 8 disposed between electric power generator 6 and internal combustion engine 7 for connection therebetween.

Namely, in the hybrid vehicle to which the present invention is applied, internal combustion engine 7 is operated to drive the electric power generator.

Electric power generation unit 5 is configured to operate (start and stop) independently of driving motor 2.

For example, electric power generator 6 is a synchronous electric motor including a rotor implemented by a permanent magnet.

Electric power generator 6 is structured to convert rotational energy generated in internal combustion engine 7 into electric energy, and supply the electric energy to battery 4 and driving motor 2 via inverter 3. When internal combustion engine 7 is started, electric power generator 6 functions also as a starter motor.

Speed reducer 8 is a gearset that includes a plurality of gears not shown, and transmits rotation of internal combustion engine 7 to electric power generator 6 at a predetermined reduction ratio (rotational speed ratio). When electric power generator 6 is employed as a starter motor for internal combustion engine 7, speed reducer 8 transmits rotation of electric power generator 6 to internal combustion engine 7.

Figure 2:
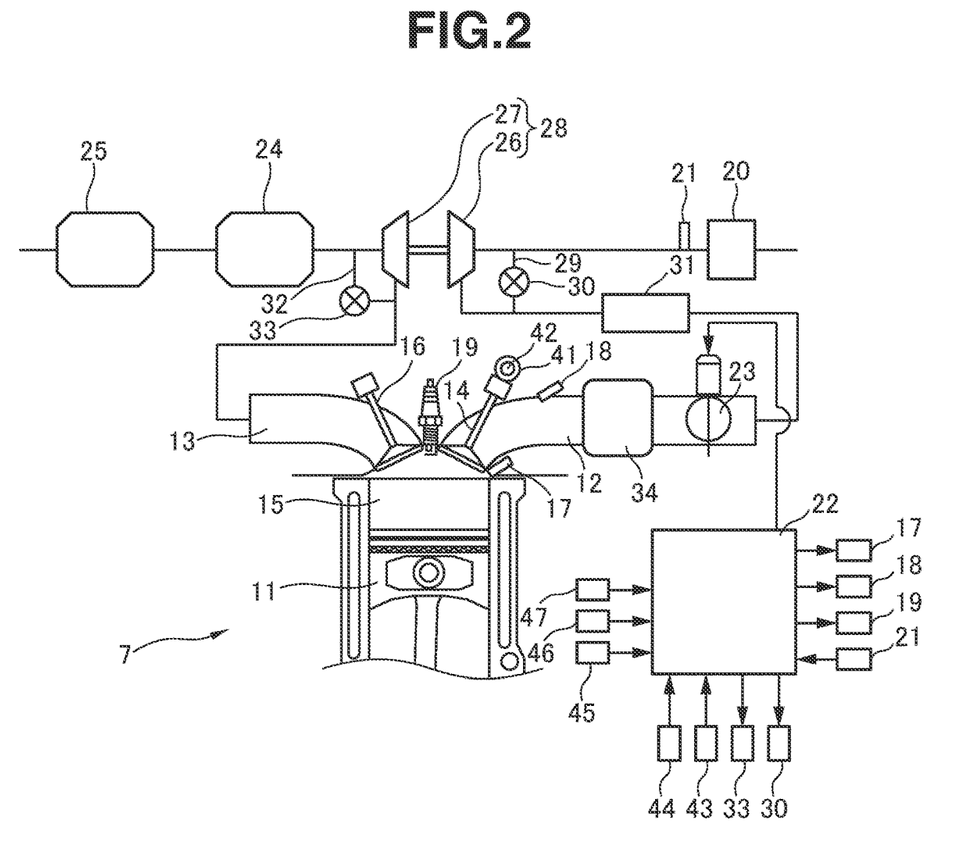
FIG. 2 is an explanatory view showing schematically system configuration of an internal combustion engine.

FIG. 2 is an explanatory view showing schematically system configuration of internal combustion engine 7.

Internal combustion engine 7 is a so-called reciprocating internal combustion engine structured to convert reciprocating linear motion of a piston 11 into rotational motion of a crankshaft not shown for power extraction. Internal combustion engine 7 is structured to vary an air fuel ratio. Internal combustion engine 7 may be started by a dedicated starter motor other than electric power generator 6.

Internal combustion engine 7 includes an intake passage 12 and an exhaust passage 13. Intake passage 12 is connected to a combustion chamber 15 via an intake valve 14. Exhaust passage 13 is connected to combustion chamber 15 via an exhaust valve 16.

Internal combustion engine 7 includes: a first fuel injection valve 17 structured to inject fuel (gasoline) directly into combustion chamber 15; and a second fuel injection valve 18 structured to inject fuel (gasoline) into a section of intake passage 12 upstream of intake valve 14. The fuel injected from first fuel injection valve 17 and second fuel injection valve 18 is ignited in combustion chamber 15 by an ignition plug 19.

Intake passage 12 is provided with: an aft cleaner 20 structured to collect foreign matter in intake air; an air flow meter 21 structured to measure an amount of intake air; an electric throttle valve 23 whose opening is controlled by a control signal from a control unit 22.

Air flow meter 21 is arranged upstream of throttle valve 23. Air flow meter 21 contains a temperature sensor, and structured to measure a temperature of intake air at an intake air inlet. Air cleaner 20 is arranged upstream of air flow meter 21.

Exhaust passage 13 is provided with: an upstream exhaust catalyst device 24 such as a three-way catalyst; and a downstream exhaust catalyst device 25 such as a NOx trap catalyst. Downstream exhaust catalyst device 25 is arranged downstream of upstream exhaust catalyst device 24.

Internal combustion engine 7 further includes a supercharger (turbocharger) 28 that includes a compressor 26 provided in intake passage 12 and an exhaust turbine 27 provided in exhaust passage 13, wherein compressor 26 and exhaust turbine 27 are arranged coaxially. Compressor 26 is arranged upstream of throttle valve 23, and downstream of air flow meter 21. Exhaust turbine 27 is arranged upstream of upstream exhaust catalyst device 24.

Intake passage 12 is connected to a recirculation passage 29. Recirculation passage 29 includes a first end connected to a section of intake passage 12 upstream of compressor 26, and a second end connected to a section of intake passage 12 downstream of compressor 26.

Recirculation passage 29 is provided with an electric recirculation valve 30 structured to relieve a boost pressure from a downstream side of compressor 26 to an upstream side of compressor 26. Recirculation valve 30 may be implemented by a so-called check valve structured to open only when pressure at the downstream side of compressor 26 is higher than or equal to a predetermined pressure point.

Intake passage 12 is further provided with an intercooler 31 downstream of compressor 26 for cooling intake air compressed (pressurized) by compressor 26, and thereby enhancing charging efficiency. Intercooler 31 is arranged downstream of the downstream end of recirculation passage 29 and upstream of throttle valve 23.

Exhaust passage 13 is connected to an exhaust bypass passage 32 that bypasses exhaust turbine 27 and connects an upstream side of exhaust turbine 27 to a downstream side of exhaust turbine 27. Exhaust bypass passage 32 includes a downstream end connected to a section of exhaust passage 13 upstream of upstream exhaust catalyst device 24. Exhaust bypass passage 32 is provided with an electric waste gate 33 structured to control a flow rate of exhaust gas in the exhaust bypass passage 32. Waste gate 33 is structured to allow a part of exhaust gas, which is to be guided to exhaust turbine 27, to bypass to the downstream side of exhaust turbine 27, and thereby control the boost pressure of internal combustion engine 7.

FIG. 1 shows a collector section 34 of intake passage 12. If internal combustion engine 7 is a multi-cylinder internal combustion engine, intake passage 12 includes an intake manifold branched for each cylinder in a section downstream of collector section 34.

Supercharger 28 is not limited to a turbocharger as described above, but may be a mechanical supercharger in which a compressor arranged in intake passage 12 is driven by internal combustion engine 7, or may be an electric supercharger in which a compressor arranged in intake passage 12 is driven by an electric motor, for example.

Internal combustion engine 7 includes a valve operating mechanism for intake valve 14, which is implemented by an intake-side variable valve mechanism 41 structured to vary valve timing (opening and closing timings) of intake valve 14.

Intake-side variable valve mechanism 41 is a variable phase mechanism structured to continuously advance and retard a phase of a central angle of lifting of intake valve 14 (with respect to the crankshaft not shown). The variable phase mechanism is structured as publicly known by Japanese Patent Application Publication No. 2002-89303 and others, and includes an intake camshaft 42 for driving the intake valve 14 to open and close, wherein the phase of intake camshaft 42 is made to advance and retard with respect to the crankshaft not shown.

Exhaust valve 16 is provided with a valve operating mechanism of a general direct-acting type. Accordingly, exhaust valve 16 has a constant lift operating angle, and a constant lift central angle phase.

Intake-side variable valve mechanism 41 is hydraulically driven or so, and is controlled by a control signal from control unit 22. Namely, control unit 22 serves as a control section to control intake-side variable valve mechanism 41. Control unit 22 is configured to control the valve timing of intake valve 14 variably. Intake-side variable valve mechanism 41 is structured to vary the closing timing of intake valve 14, and thereby vary the amount of air in the cylinder. For example, when the intake valve closing timing is more retarded than the bottom dead center, intake air throttling for suppressing air from entering the cylinder is implemented by retarding the intake valve closing timing away from the bottom dead center. On the other hand, when the intake valve closing timing is more advanced than the bottom dead center, intake air throttling for suppressing air from entering the cylinder is implemented by advancing the intake valve closing timing away from the bottom dead center. Namely, intake-side variable valve mechanism 41 serves as an intake air throttling section capable of varying the amount of air supplied into the cylinder. The intake air throttling section is a component that is located downstream of throttle valve 23, and structured to vary the amount of air supplied into the cylinder, and perform the intake air throttling for suppressing air from being entering the cylinder. In other words, the intake air throttling section is a component other than throttle valve 23, and for example, is a component located downstream of collector section 34 and structured to control the in-cylinder air amount.

Intake-side variable valve mechanism 41 may be of a type capable of varying the opening timing and closing timing of intake valve 14 independently of each other. Intake-side variable valve mechanism 41 is not limited to the type being hydraulically driven, but may be electrically driven by an electric motor or the like.

Intake-side variable valve mechanism 41, which serves as an intake air throttling section, may be a variable lift operation angle mechanism structured to vary the lift amount and operation angle of intake valve 14, The variable lift operating angle mechanism is structured as publicly known from Japanese Patent Application Publication No. 2002-89303 or so to expand and contract the lift amount and operating angle of intake valve 14 simultaneously and continuously.

When intake-side variable valve mechanism 41 is implemented by a variable lift operating angle mechanism, it is possible to suppress air from entering the cylinder by reducing the lift amount of intake valve 14 or reducing the operating angle of intake valve 14.

Furthermore, intake-side variable valve mechanism 41, which serves as an intake air throttling section, may be composed of a variable phase mechanism for continuously advancing or retarding the phase of the lift central angle of intake valve 14, and a variable lift operation angle mechanism for varying the lift amount and operating angle of intake valve 14.

Control unit 22 is a well-known digital computer including a CPU, a ROM, a RAM, and an input/output interface.

Control unit 22 is configured to receive input of a sensing signal from air flow meter 21, and also sensing signals from various sensors and others such as an intake camshaft position sensor 43 for sensing the valve timing of intake valve 14, a vehicle speed sensor 44 for sensing the vehicle speed, a crank angle sensor 45 for sensing a crank angle of the crankshaft, an accelerator opening sensor 46 for sensing an amount of depression of an accelerator pedal, and an intake pressure sensor 47 for sensing a collector pressure that is a pressure of intake aft in collector section 34.

Intake-side camshaft position sensor 43 senses the phase of intake camshaft 42 with respect to the crankshaft.

Vehicle speed sensor 44 serves as a vehicle speed measuring section.

Crank angle sensor 45 is capable of measuring the engine speed of internal combustion engine 7.

Accelerator opening sensor 46 is capable of measuring an accelerator opening that is an operation amount of the accelerator pedal, and an accelerator change speed that is an operation speed of the accelerator pedal. Accelerator opening sensor 46 serves as an accelerator operation quantity measuring section.

Crank angle sensor 45 is capable of measuring the engine speed of internal combustion engine 7.

On the basis of the sensing signals from the various sensors and others, control unit 22 controls optimally the injection amount and injection timing of the fuel injected from first fuel injection valve 17 and second fuel injection valve 18, and the ignition timing (of ignition plug 19) and intake air amount, etc. of internal combustion engine 7, and also controls the air fuel ratio of internal combustion engine 7.

Control unit 22 calculates a required engine load of the internal combustion engine (internal combustion engine load), based on the measured value of accelerator opening sensor 46.

Control unit 22 is also configured to measure an SOC (State Of Charge) of battery 4 that is a ratio of remaining charge quantity to charge capacity of battery 4.

The hybrid vehicle of the embodiment is a so-called series hybrid vehicle that runs by driving the driving motor 2 with electric power from electric power generator 6 driven by internal combustion engine 7 and electric power from battery 4. The series hybrid vehicle is configured to drive the internal combustion engine 7 to charge the battery 4, when the SOC of battery 4 is low.

In the series hybrid vehicle, electric power that can be supplied to driving motor 2 is generally determined by the capacity of battery 4 that supplies electric power to driving motor 2. In many cases of series hybrid vehicles, the capacity of battery 4 that supplies electric power to driving motor 2 is small, so that the electric power from battery 4 may be limited, Therefore, the series hybrid vehicle, in which the electric power from battery 4 is limited, is limited in driving performance when operating the driving motor 2.

When driving motor 2 is required to output high power, the series hybrid vehicle requires an assist of electric power generated by electric power generator 6 by driving the internal combustion engine 7, in addition to the electric power from battery 4.

However, when internal combustion engine 7 is at rest, internal combustion engine 7 cannot generate a desired engine power output instantaneously in response to a request for high power of driving motor 2. Namely, when internal combustion engine 7 is started after receipt of an acceleration request, the driving performance of the vehicle may be adversely affected until the desired engine power output is produced by internal combustion engine 7.

Therefore, internal combustion engine 7 is required to perform a standby operation for standby to assist electric power supply to driving motor 2, taking it into account that the requested power output of driving motor 2 may be increased due to the acceleration request.

Basically, in the standby operation, both of the electric power supplied from battery 4 and the electric power generated by electric power generator 6 by operating the internal combustion engine 7 are supplied to driving motor 2.

During the standby operation, the vehicle can be smoothly accelerated in response to an acceleration request, because it is ready to assist power supply to driving motor 2.

In many cases of series hybrid vehicles, the capacity of battery 4 that supplies electric power to driving motor 2 is small. Accordingly, in such a series hybrid vehicle, battery 4 is fully charged in a short time, when internal combustion engine 7 is operated with its operating point set at a point of maximum thermal efficiency during the standby operation.

In order to prevent battery 4 from being fully charged during the standby operation, it is effective to set the operating point of internal combustion engine 7 for the standby operation to an operating point where the engine power output is low, not an operating point where the thermal efficiency is optimized.

In cases of series hybrid vehicles, it is desirable so that the generated energy is supplied directly to driving motor 2 without being stored in battery 4 where possible, in consideration of the charge/discharge efficiency of battery 4 that supplies electric power to driving motor 2.

During the standby operation, by causing the electric power generator 6 to generate electric power only for energy required for running, the series hybrid vehicle can be operated with a suppressed energy loss regarding the charge/discharge efficiency.

However, when the operating point shifts quickly, it may cause undesirably adversely affect the fuel efficiency, depending on the accuracy of transient intake air quantity control and transient fuel injection quantity control of internal combustion engine 7. In other words, in some situations, it is desirable to set the operating point of internal combustion engine 7 to an operating point of lower engine power output during the standby operation.

Reduction of the engine power output of internal combustion engine 7 may be implemented by reducing the engine speed, reducing the engine load, reducing the engine speed and engine load, etc.

In general, it is known that low engine load and speed operation tends to adversely affect gas flow motion in the cylinder, and thereby suppress the combustion from being performed ideally. Especially for carrying out lean combustion, it is very important to ensure combustion stability by gas flow motion in the cylinder. Namely, during lean combustion, internal combustion engine 7 is required to satisfy a requirement about engine load and the engine speed, in consideration that degradation in combustion stability causes degradation in exhaust performance.

The requirement about engine load and speed of internal combustion engine 7 during lean combustion depends on specifications of internal combustion engine 7. Therefore, threshold values of the engine load and speed of internal combustion engine 7 during lean combustion are confirmed and set individually in accordance with the specifications. Furthermore, it is desirable to constantly monitor the combustion stability of internal combustion engine 7, and operate internal combustion engine 7 at a point of engine load and engine speed that ensures the combustion stability.

It is known that in internal combustion engine 7, variation in distribution of in-cylinder air quantity among cylinders due to variation among components of the intake system can be suppressed by supercharging air into the cylinders with compressor 26.

For internal combustion engine 7 equipped with supercharger 28, it is desirable to perform lean combustion in a supercharging region in which it is easy to ensure combustion stability by suppressing variation in distribution of in-cylinder air quantity among cylinders.

When combustion stability cannot be ensured to perform the lean combustion, internal combustion engine 7 is required to shift to stoichiometric combustion in which the air fuel ratio is set to the stoichiometric air fuel ratio. However, when the stoichiometric combustion is performed, and the $O_2$ storage quantity of the three-way catalyst (upstream exhaust catalyst device 24) arranged in the exhaust system of internal combustion engine 7 becomes excessive, internal combustion engine 7 is required to perform so-called rich spike operation to increase the fuel injection quantity temporarily, which may become a factor for adversely so affecting the fuel efficiency.

When the engine power output of internal combustion engine 7 is reduced by reducing the engine speed, booming noise may occur in a compartment of the vehicle, depending on the vehicle or system.

When the engine power output of internal combustion engine 7 is reduced by reducing the engine load of internal combustion engine 7, gear noise may occur due to torque fluctuation, depending on the vehicle or system. The gear noise occurs in speed reducer 8 arranged between internal combustion engine 7 and electric power generator 6.

Accordingly, when the engine power output of internal combustion engine 7 is reduced by reducing the engine speed or engine load of internal combustion engine 7, it is required to suppress sound and vibration performance from being adversely affected, by suppressing the occurrence of booming noise or gear noise by controlling the reduction of the engine speed or engine load depending on the vehicle.

The region where booming noise or gear noise occurs varies depending on the vehicle and system. Therefore, it is required to determine for each vehicle and system individually whether or not a commanded operating point of the internal combustion engine is within the region where booming noise and gear noise occurs.

Accordingly, for the series hybrid vehicle according to the embodiment described above, the standby operation of internal combustion engine 7 for standby to assist electric power supply to driving motor 2 is performed at an operating point lower in engine power output than an operating point set for charging the battery 4, wherein the collector pressure of internal combustion engine 7 is higher than or equal to a predetermined collector pressure threshold value (intake pressure threshold value) at the former operating point.

It is assumed in the present description that the operating point is determined by the engine load and engine speed of internal combustion engine 7.

Figure 3:
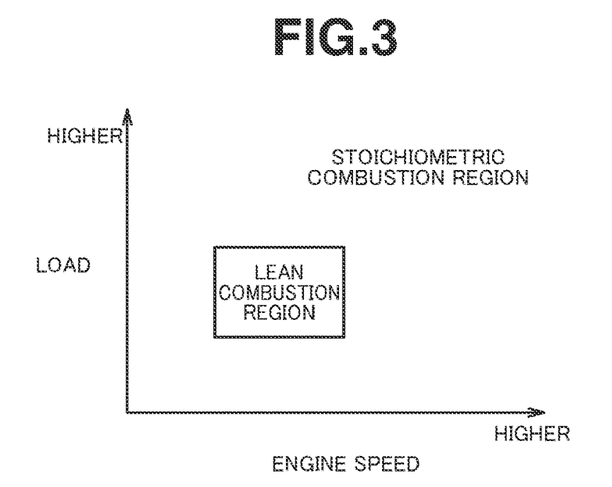
FIG. 3 is an explanatory view showing schematically setting of combustion regions of the internal combustion engine.

During the standby operation of internal combustion engine 7 for standby to assist electric power supply to driving motor 2, the lean combustion operation is employed in which the air fuel ratio is leaner than the stoichiometric air fuel ratio point. Specifically, during the standby operation for standby to assist electric power supply to driving motor 2, internal combustion engine 7 is operated at an operating point within a predetermined lean combustion region in which the lean combustion operation is performed, as shown in FIG. 3.

The collector pressure threshold value serves as an intake pressure threshold value. The collector pressure threshold value is a standard of combustion stability of internal combustion engine 7, and is predetermined experimentally or so. The collector pressure threshold value is within the supercharging operation region of internal combustion engine 7. When the collector pressure is lower than the collector pressure threshold value, internal combustion engine 7 may be unstable in combustion.

According to the foregoing, the standby operation of internal combustion engine 7 for standby to assist electric power supply to driving motor 2 serves to enhance a response of acceleration to an acceleration request. The standby operation further serves to ensure combustion stability of internal combustion engine 7 during the standby operation, while suppressing overcharging during the standby operation.

The state of combustion (combustion stability) of internal combustion engine 7 may be determined based on a sensing signal from an in-cylinder pressure sensor structured to sense an in-cylinder pressure of internal combustion engine 7, and/or a sensing signal from a sensor structured to sense fluctuation of rotation of the crankshaft (crank angle sensor 45 in this example), for example.

When the in-cylinder pressure sensor is employed, it is possible to determine whether or not the combustion state of the internal combustion engine is stable, by a combustion analysis based on the in-cylinder pressure sensed in real time.

When the sensor structured to sense the rotational fluctuation of the crankshaft is employed, it is possible to determine whether or not the combustion state of the internal combustion engine is stable, based on changes in angular velocity of the crankshaft. For example, the combustion state of internal combustion engine 7 may be determined as stable, when a quantity of change in the angular velocity of the crankshaft is less than or equal to a predetermined angular velocity change threshold value.

In this way, the standby operation of internal combustion engine 7 for standby to assist electric power supply to driving motor 2 may be performed at an operating point lower in engine power output than the operating point for charging the battery 4, wherein combustion stability of internal combustion engine 7 is ensured at the former operating point.

Specifically, the standby operation of internal combustion engine 7 for standby to assist electric power supply to driving motor 2 is performed, when the vehicle speed is higher than or equal to a predetermined vehicle speed threshold value, and at least one of the operation amount and operation speed of the accelerator pedal is higher than or equal to a predetermined operation amount threshold value or a predetermined operation speed threshold value.

The vehicle speed threshold value may be determined in consideration of the weight of the vehicle. For example, the vehicle speed threshold value is set to decrease as the weight of the vehicle increases. Furthermore, the weight of the vehicle may be measured by a vehicle weight measuring section while the vehicle is travelling. For example, the vehicle weight measuring section is configured to sense a suspension stroke or the like with a sensor, and measure the vehicle weight based on a degree of depression of the vehicle when the vehicle is stationary.

The operating point of internal combustion engine 7 for performing the standby operation of internal combustion engine 7 for standby to assist electric power supply to driving motor 2 is lower in engine load than the operating point for charging the battery 4 in response to a condition that the SOC of battery 4 is less than a predetermined SOC threshold value.

This serves to reduce the power output of internal combustion engine 7.

Furthermore, during the standby operation of internal combustion engine 7 for standby to assist electric power supply to driving motor 2, the engine speed of internal combustion engine 7 may be lowered within a lower limit set to a predetermined rotation speed threshold.

This also serves to reduce the power output of the internal combustion engine.

Furthermore, the engine power output generated by internal combustion engine 7 during the standby operation of internal combustion engine 7 for the auxiliary power supply to driving motor 2 may be in balance with electric power consumed by driving motor 2 during the standby operation.

This allows the standby operation to be performed without increase in the SOC of battery 4.

The collector pressure threshold value may be set in the supercharging region where supercharging is performed by supercharger 28.

During the standby operation of internal combustion engine 7 for standby to assist electric power supply to driving motor 2, this serves to suppress variation in distribution of in-cylinder air quantity among cylinders downstream of supercharger 28 under application of the boost pressure, and thereby achieve more stable lean combustion.

The standby operation of internal combustion engine 7 for standby to assist electric power supply to driving motor 2 may be implemented by controlling the intake-side variable valve mechanism 41 so as to suppress air from entering the cylinder of internal combustion engine 7, and simultaneously performing supercharging with supercharger 28.

Figure 4:
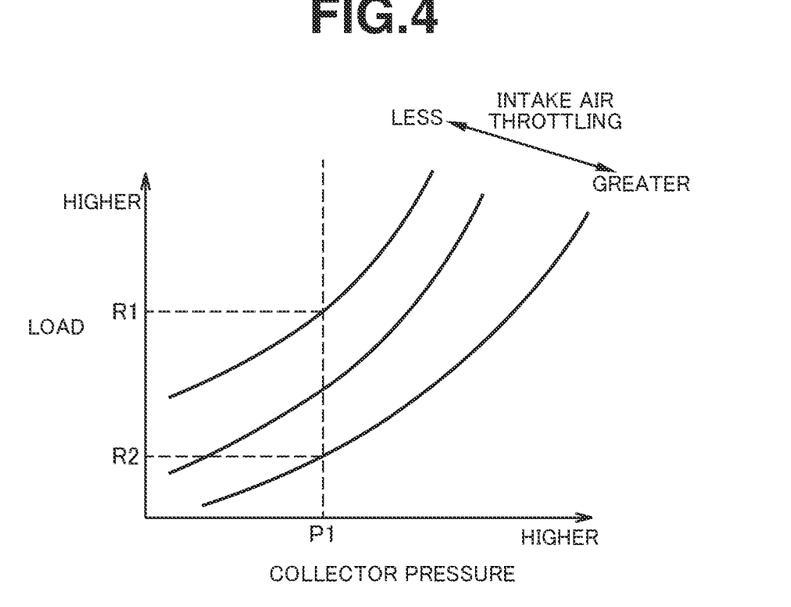
FIG. 4 is an explanatory view showing schematically a relationship among collector pressure, internal combustion engine load, and intake air throttling.

FIG. 4 is an explanatory view showing schematically a relationship among the collector pressure, internal combustion engine load, and intake air throttling. The combustion stability of internal combustion engine 7 is adversely affected when the collector pressure falls below a predetermined combustion stability threshold value P1. The collector pressure is raised by maintaining the engine load of internal combustion engine 7 while controlling the intake-side variable valve mechanism 41 so as to suppress air from entering the cylinder.

The collector pressure can be increased without changing the quantity of air in the cylinder, by performing supercharging by supercharger 28 while controlling the intake-side variable valve mechanism 41 so as to suppress air from entering the cylinder. In other words, the quantity of air in the cylinder can be reduced without changing the collector pressure by performing supercharging by supercharger 28 while controlling the intake-side variable valve mechanism 41 so as to suppress air from entering the cylinder.

Figure 5:
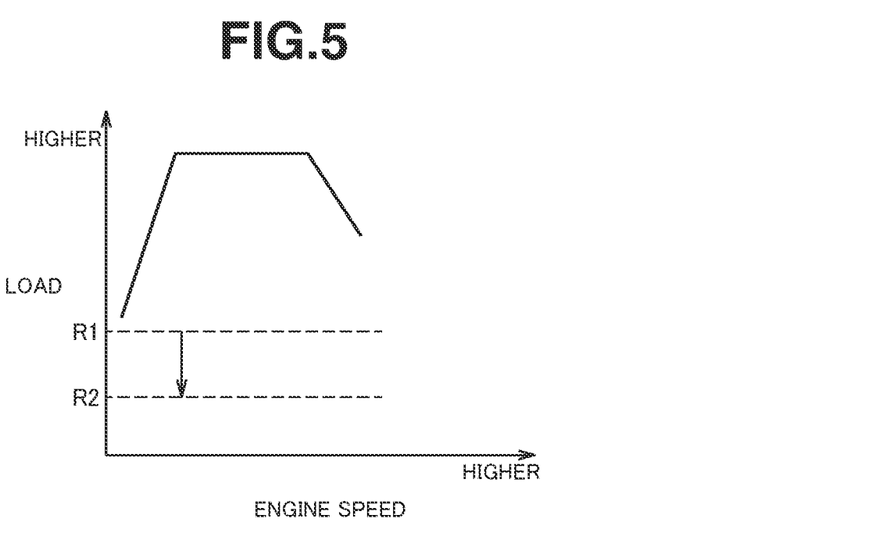
FIG. 5 is an explanatory view showing schematically a supercharging region of the internal combustion engine.

By performing supercharging while controlling the intake-side variable valve mechanism 41 so as to suppress air from entering the cylinder, the lower limit of the engine load of internal combustion engine 7, which corresponds to the combustion stability threshold value P1, decreases from R1 to R2 as shown in FIGS. 4 and 5.

In other words, by performing supercharging while controlling the intake-side variable valve mechanism 41 so as to suppress air from entering the cylinder, the supercharging region of internal combustion engine 7 can be expanded for lower engine load as shown by broken lines in FIG. 5. In the supercharging region, the collector pressure is higher than the atmospheric pressure.

When the operating point of internal combustion engine 7 is in a predetermined region undesirable for noise and vibration during the standby operation of internal combustion engine 7 for standby to assist electric power supply to driving motor 2, the operating point of internal combustion engine 7 may be shifted out of the predetermined region undesirable for noise and vibration.

This serves to suppress noise and vibration.

When the noise and vibration contains a booming noise caused by torque fluctuation of internal combustion engine 7, the operating point of internal combustion engine 7 is shifted for higher engine speed.

The operation region of internal combustion engine 7 in which booming noise occurs may be identified beforehand with the engine speed and engine load.

This serves to shift the operating point of internal combustion engine 7 out of the operation region where booming noise occurs, and thereby suppress noise and vibration due to booming noise in the vehicle.

If the noise and vibration is caused by gear noise of speed reducer 8, the operating point is shifted for higher engine load.

The operation region of internal combustion engine 7 in which gear noise occurs can be identified beforehand with the engine speed and engine load.

This serves to shift the operating point of internal combustion engine 7 out of the operation region where gear noise occurs, and thereby suppress noise and vibration due to gear noise in the vehicle.

Figure 6:
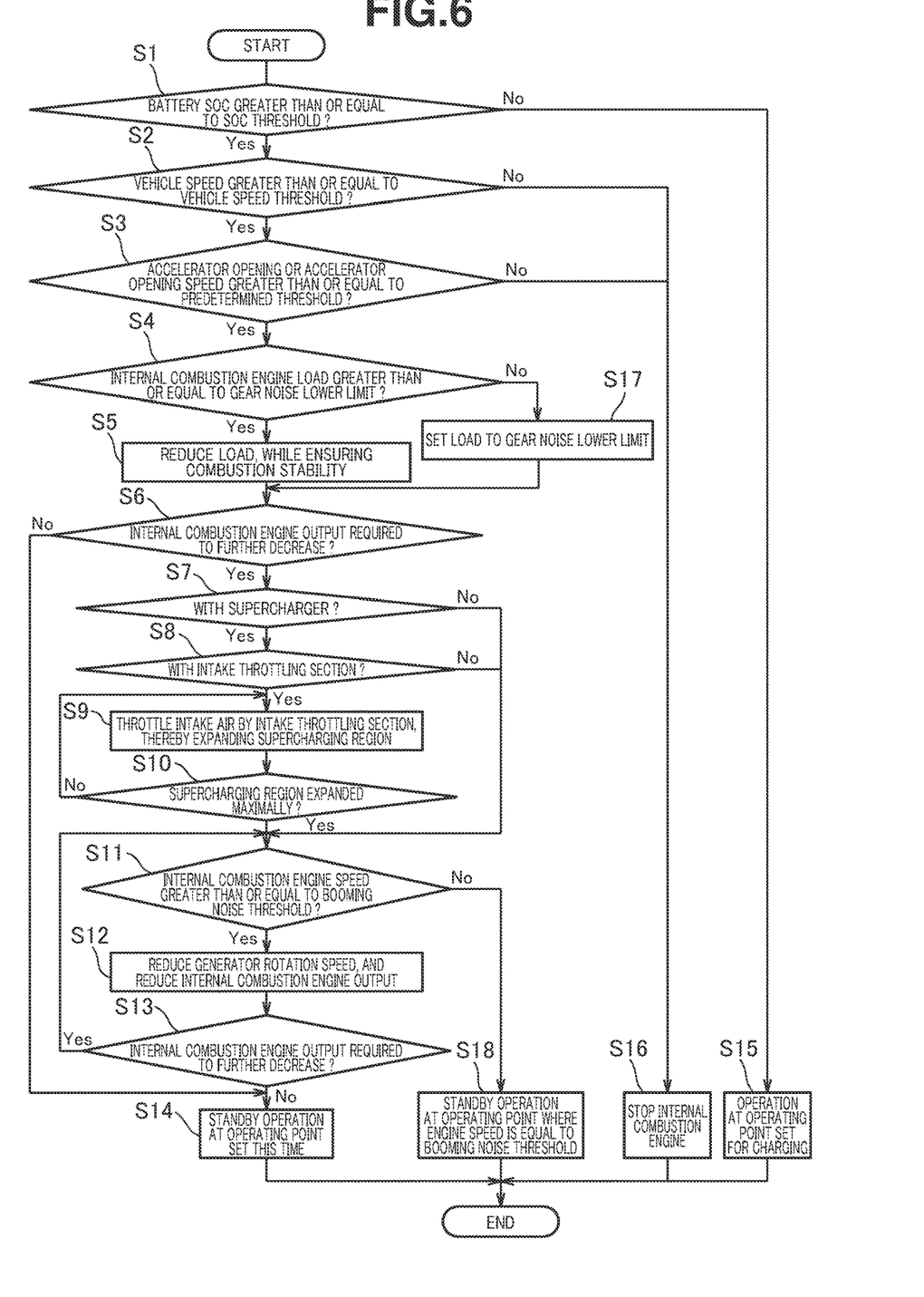
FIG. 6 is a flowchart showing a flow of vehicle control.

FIG. 6 is a flowchart showing a flow of vehicle control according to the embodiment described above. This routine is repeatedly executed by control unit 22 at intervals of a predetermined time period (for example, every 10 ms).

At Step S1, control unit 22 determines whether or not the SOC of battery 4 is higher than or equal to the SOC threshold value. When determining at Step S1 that the SOC of battery 4 is higher than or equal to the SOC threshold value, control unit 22 proceeds to Step S2. When determining at Step S1 that the SOC of battery 4 is less than the SOC threshold value, control unit 22 proceeds to Step S15. At Step S15, control unit 22 operates internal combustion engine 7 at the operating point for charging.

The operating point for charging is an operating point where the fuel efficiency is high. When the requested engine power output of internal combustion engine 7 is high, the operating point for charging may be set to an operating point in the stoichiometric combustion region where the stoichiometric combustion is performed.

Namely, the charging operating point set at Step S15 is basically in the lean combustion region, and when the requested engine power output of internal combustion engine 7 is high, is in the stoichiometric combustion region.

When the process proceeds to Step S15 while internal combustion engine 7 is at rest, internal combustion engine 7 starts to be operated at the charging operating point at Step S15.

At Step S2, control unit 22 determines whether or not the vehicle speed is higher than or equal to the vehicle speed threshold value. When determining at Step S2 that the vehicle speed is higher than or equal to the vehicle speed threshold value, control unit 22 proceeds to Step S3. When determining at Step S2 that the vehicle speed is less than the vehicle speed threshold value, control unit 22 proceeds to Step S16. At Step S16, control unit 22 stops internal combustion engine 7.

When the process proceeds to Step S16 while internal combustion engine 7 is at rest, internal combustion engine 7 is maintained at rest at Step S16.

When the vehicle speed is less than the vehicle speed threshold value, driving motor 2 requires less electric power. Specifically, when the vehicle speed is less than the vehicle speed threshold value, the electric power required by driving motor 2 can be stably satisfied only by the electric energy stored in battery 4. Accordingly, when the vehicle speed is less than the vehicle speed threshold value, it is not required to perform the standby operation of internal combustion engine 7 for standby to assist electric power supply to driving motor 2.

At Step S3, control unit 22 determines whether or not the accelerator opening or the accelerator opening speed, which is the accelerator change rate, is greater than or equal to a predetermined threshold value. Namely, control unit 22 determines whether or not the accelerator opening is greater than or equal to a predetermined opening threshold value, or whether or not the accelerator opening speed is greater than or equal to a predetermined opening speed threshold value. The accelerator opening speed is a rate of change of the accelerator when the accelerator pedal is depressed.

When determining at Step S3 that the accelerator opening or the accelerator opening speed is equal to or greater than the predetermined threshold value, control unit 22 proceeds to Step S4. When determining at Step S3 that the accelerator opening or the accelerator opening speed is less than the predetermined threshold value, control unit 22 determines that the driver's requested acceleration is low and the standby operation is not required, and then proceeds to Step S16.

At Step S4, control unit 22 determines whether or not the engine load of internal combustion engine 7 is higher than or equal to a predetermined gear noise lower limit value. The gear noise lower limit value is an upper limit value of the engine load in the operation region where gear noise occurs. Namely, in the operation region where the engine load of internal combustion engine 7 is less than the gear noise lower limit value, gear noise may occur in speed reducer 8.

For the standby operation, the operating point of internal combustion engine 7 is initially set to the operating point for charging within the lean combustion region.

When determining at Step S4 that the engine load of internal combustion engine 7 is higher than or equal to the gear noise lower limit value, control unit 22 proceeds to Step S5. Namely, when determining that the engine load of internal combustion engine 7 can be reduced while being maintained in the region where no gear noise occurs in speed reducer 8, control unit 22 proceeds from Step S4 to Step S5. When determining at Step S4 that the engine load of internal combustion engine 7 is less than the gear noise lower limit value, control unit 22 proceeds to Step S17.

At Step S17, control unit 22 sets the engine load of internal combustion engine 7 to the gear noise lower limit value. When the engine load of internal combustion engine 7 is less than the gear noise lower limit value, the setting of the engine load of internal combustion engine 7 to the gear noise lower limit value serves to suppress the occurrence of gear noise.

At Step S5, control unit 22 reduces the target engine load of the operating point during the standby operation of internal combustion engine 7 by a predetermined amount, for ensuring combustion stability of internal combustion engine 7. Specifically, the engine load of internal combustion engine 7 is reduced while preventing the collector pressure from failing below the collector pressure threshold value.

At Step S5, the engine load of internal combustion engine 7 may be reduced while allowing generation of electric power corresponding to electric power consumed by driving motor 2. Furthermore, the amount of reduction of the engine load at Step S5 may be set in accordance with the electric power consumption of driving motor 2, the engine load and speed corresponding to the minimum engine power output allowable under the current driving condition, etc.

At Step S6, control unit 22 determines whether or not the engine power output of internal combustion engine 7 is required to further decrease. Specifically, unit 22 determines whether or not the engine power output of internal combustion engine 7 is required to further decrease, based on at least two of the SOC of battery 4, the electric power used by driving motor 2, and the electric power generated by electric power generator 6. More specifically, when the SOC of battery 4 increases, or when the generated electric power is greater than the electric power consumed by driving motor 2, the engine power output of internal combustion engine 7 is required to further decrease, for preventing the battery 4 from being further charged.

When determining at Step S6 that the engine power output of internal combustion engine 7 is required to further decrease, control unit 22 proceeds to Step S7. When determining at Step S6 that the engine power output of internal combustion engine 7 is not required to further decrease, control unit 22 proceeds to Step S14.

At Step S7, control unit 22 determines whether or not internal combustion engine 7 is provided with supercharger 28. When determining that internal combustion engine 7 is provided with supercharger 28, control unit 22 proceeds to Step S8. When determining that internal combustion engine 7 is provided with no supercharger 28, control unit 22 proceeds to Step S11.

At Step S8, control unit 22 determines whether or not internal combustion engine 7 is provided with the intake air throttling section. When determining that internal combustion engine 7 is provided with the intake air throttling section (intake-side variable valve mechanism 41 in this example), control unit 22 proceeds to Step S9. When determining that internal combustion engine 7 is provided with no intake air throttling section (intake-side variable valve mechanism 41 in this example), control unit 22 proceeds to Step S11.

At Step S9, control unit 22 expands the supercharging region of supercharger 28 for low engine load, by throttling the intake air by the intake air throttling section (intake-side variable valve mechanism 41 in this example). For example, when the intake valve closing timing is more retarded than the bottom dead center, the intake valve closing timing is retarded by a predetermined amount so as to throttle the intake air (intake air throttling is performed). On the other hand, when the intake valve closing timing is more advanced than the bottom dead center, the intake valve closing timing is advanced by a predetermined amount so as to throttle the intake air (intake air throttling is performed).

At Step S10, control unit 22 determines whether or not the supercharging region has reached a limit of expansion. Specifically, when determining that the intake throttling by intake-side variable valve mechanism 41 can be further performed with the collector pressure maintained above the collector pressure threshold value, control unit 22 proceeds to Step S9. When determining that the intake throttling by intake-side variable valve mechanism 41 cannot be further performed with the collector pressure maintained above the collector pressure threshold value, control unit 22 proceeds to Step S11.

At Step S11, control unit 22 determines whether or not the engine speed of internal combustion engine 7 is higher than or equal to a predetermined booming noise rotation speed threshold value.

The booming noise rotation speed threshold value is an upper limit value of the engine speed in the operation region where booming noise occurs. Namely, booming noise may occur in the operation region where the engine speed of internal combustion engine 7 is less than the booming noise rotation speed threshold value.

When determining at Step S11 that the engine speed of internal combustion engine 7 is higher than or equal to the booming noise rotation speed threshold value, control unit 22 proceeds to Step S12, Namely, when the engine speed of internal combustion engine 7 can be reduced within a region where no booming noise occurs, the process proceeds from Step S11 to Step S12. When determining at Step S11 that the engine speed of internal combustion engine 7 is less than the booming noise rotation speed threshold value, control unit 22 proceeds to Step S18.

At Step S18, control unit 22 sets the engine speed of internal combustion engine 7 to the booming noise rotation speed threshold value, and set the engine load of internal combustion engine 7 to the value set in the present routine, and perform the standby operation of internal combustion engine 7. When the engine speed of internal combustion engine 7 is less than the booming noise rotation speed threshold, the setting of the engine speed of internal combustion engine 7 to the booming noise rotation speed threshold serves to suppress the booming noise.

At Step S18, the standby operation of internal combustion engine 7 is performed at the operating point set in the present routine. The operating point of the standby operation performed at Step S18 is in the lean combustion region.

When the process proceeds to Step S18 while internal combustion engine 7 is at rest, internal combustion engine 7 starts the standby operation at Step S18.

At Step S12, control unit 22 reduces the rotation speed of electric power generator 6 and reduces the engine power output of internal combustion engine 7. Namely, at Step S12, the engine power output of internal combustion engine 7 is reduced by reducing the target engine speed of the operating point during the standby operation of internal combustion engine 7 by the predetermined amount. Specifically, the engine speed of internal combustion engine 7 is reduced while preventing the collector pressure from falling below the collector pressure threshold value.

At Step S12, the engine speed of internal combustion engine 7 may be reduced while allowing generation of electric power generation corresponding to the electric power consumed by driving motor 2. Furthermore, the amount of reduction of the engine speed at Step S12 may be set in accordance with the electric power consumption of driving motor 2, the engine load and speed corresponding to the minimum engine power output allowable under the current driving condition, etc.

At Step S13, control unit 22 determines whether or not the engine power output of internal combustion engine 7 is required to further decrease. Specifically, unit 22 determines whether or not the engine power output of internal combustion engine 7 is required to further decrease, based on at least two of the SOC of battery 4, the electric power used by driving motor 2, and the electric power generated by electric power generator 6. More specifically, when the SOC of battery 4 increases, or when the generated electric power is greater than the electric power consumed by driving motor 2, the engine power output of internal combustion engine 7 is required to further decrease, for preventing the battery 4 from being further charged.

When determining at Step S13 that the engine power output of internal combustion engine 7 is required to further decrease, control unit 22 proceeds to Step S11. When determining at Step S13 that the engine power output of internal combustion engine 7 is not required to further decrease, control unit 22 proceeds to Step S14.

At Step S14, the standby operation of internal combustion engine 7 is performed at the operating point set in the present routine. The operating point of the standby operation performed at Step S14 is in the lean combustion region. When the process proceeds to Step S14 while internal combustion engine 7 is at rest, internal combustion engine 7 starts the standby operation at Step S14.

When the engine power output of internal combustion engine 7 is reduced for performing the standby operation of internal combustion engine 7 for standby to assist electric power supply to driving motor 2, the engine load may be reduced in advance to decrease of the engine speed. The engine power output of internal combustion engine 7 can be reduced more responsively by reducing the engine load than by reducing the engine speed.

The embodiment described above relates to a vehicle control method and a vehicle control device.

The invention claimed is:

1. A vehicle control method for a vehicle,
the vehicle including:
an electric power generator structured to generate electric power and supply the electric power to a battery;
an electric motor structured to be driven by electric power from the battery or from the electric power generator, and drive the vehicle; and
an internal combustion engine structured to drive the electric power generator;
the vehicle control method comprising:
providing an accelerator operation quantity measuring section structured to measure an operation amount of an accelerator pedal of the vehicle, or an operation speed of the accelerator pedal;
stopping the internal combustion engine in response to a condition that the operation amount of the accelerator pedal is less than a predetermined operation amount threshold value or a condition that the operation speed of the accelerator pedal is less than a predetermined operation speed threshold value; and
performing a standby operation of the internal combustion engine for standby to assist electric power supply to the electric motor, under a condition that an SOC of the battery is greater than or equal to a predetermined SOC threshold value, in response to a condition that the operation amount of the accelerator pedal is greater than or equal to the predetermined operation amount threshold value or a condition that the operation speed of the accelerator pedal is greater than or equal to the predetermined operation speed threshold value;
wherein the standby operation is implemented by employing an operating point that is lower in engine power output than an operating point set for charging the battery in response to a condition that the SOC of the battery is less than the SOC threshold value.

2. The vehicle control method as claimed in claim 1, wherein:
the internal combustion engine is structured to control an air fuel ratio; and
the standby operation is implemented by performing a lean combustion operation at an operating point where intake pressure of the internal combustion engine is greater than or equal to a predetermined intake pressure threshold value.

3. The vehicle control method as claimed in claim 1, wherein:
the vehicle includes a vehicle speed measuring section structured to measure vehicle speed of the vehicle; and
the standby operation is performed in response to a condition that the vehicle speed is greater than or equal to a predetermined vehicle speed threshold value, and the operation amount of the accelerator pedal or the operation speed of the accelerator pedal is greater than or equal to a corresponding one of a predetermined operation amount threshold value and a predetermined operation speed threshold value.

4. The vehicle control method as claimed in claim 1, wherein the operating point of the internal combustion engine for performing the standby operation is lower in engine load than the operating point for charging the battery in response to the condition that the SOC of the battery is less than the SOC threshold value.

5. The vehicle control method as claimed in claim 1, wherein the standby operation is implemented by reducing engine speed of the internal combustion engine within a lower limit set to a predetermined rotation speed threshold value.

6. The vehicle control method as claimed in claim 1, wherein the engine power output generated by the internal combustion engine during the standby operation is in balance with electric power consumed by the electric motor during the standby operation.

7. The vehicle control method as claimed in claim 2, wherein:
the vehicle includes a supercharger structured to supercharge intake air; and
the intake pressure threshold value is set within a supercharging region where supercharging is performed by the supercharger.

8. The vehicle control method as claimed in claim 7, wherein:
the vehicle includes:
a throttle valve arranged downstream of the supercharger; and
an intake air throttling section arranged downstream of the throttle valve, and structured to vary an amount of air supplied into a cylinder of the internal combustion engine; and
the standby operation is implemented by controlling the intake air throttling section so as to suppress air from being supplied into the cylinder, and simultaneously performing supercharging by the supercharger.

9. The vehicle control method as claimed in claim 1, wherein the standby operation is implemented by shifting the internal combustion engine to an operating point out of a predetermined region undesirable for noise and vibration, in response to a condition that the internal combustion engine is at an operating point within the predetermined region undesirable for noise and vibration.

10. The vehicle control method as claimed in claim 9, wherein when the noise and vibration contains a booming noise caused by torque fluctuation of the internal combustion engine, the internal combustion engine is shifted to an operating point higher in engine speed.

11. The vehicle control method as claimed in claim 9, wherein:
the electric power generator and the internal combustion engine are connected to each other via a gearset; and
when the noise and vibration contains a gear noise caused by the gearset, the internal combustion engine is shifted to an operating point higher in engine load.

12. A vehicle control device comprising:
an electric power generator structured to generate electric power and supply the electric power to a battery;
an electric motor structured to be driven by electric power from the battery or from the electric power generator, and drive the vehicle;
an internal combustion engine structured to drive the electric power generator; and
a control section structured to control the internal combustion engine;
wherein the control section is configured to:
stop the internal combustion engine in response to a condition that the operation amount of the accelerator pedal is less than a predetermined operation amount threshold value or a condition that the operation speed of the accelerator pedal is less than a predetermined operation speed threshold value; and perform a standby operation of the internal combustion engine for standby to assist electric power supply to the electric motor, under a condition that an SOC of the battery is greater than or equal to a predetermined SOC threshold value, in response to a condition that the operation amount of the accelerator pedal is greater than or equal to the predetermined operation amount threshold value or a condition that the operation speed of the accelerator pedal is greater than or equal to the predetermined operation speed threshold value;

wherein the standby operation is implemented by employing an operating point that is lower in engine power output than an operating point set for charging the battery in response to a condition that the SOC of the battery is less than the SOC threshold value.

\* \* \* \* \*